United States Patent
Vass

(10) Patent No.: US 8,923,325 B2
(45) Date of Patent: Dec. 30, 2014

(54) CLIENT-SERVER ARCHITECTURE FOR AUDIO-VIDEO COMMUNICATIONS

(75) Inventor: Jozsef Vass, Los Gatos, CA (US)

(73) Assignee: Adobe Systems Incorporated, San Jose, CA (US)

(*) Notice: Subject to any disclaimer, the term of this patent is extended or adjusted under 35 U.S.C. 154(b) by 1254 days.

(21) Appl. No.: 12/574,533

(22) Filed: Oct. 6, 2009

(65) Prior Publication Data
US 2013/0163580 A1    Jun. 27, 2013

(51) Int. Cl.
*H04J 3/22* (2006.01)
(52) U.S. Cl.
USPC ............ 370/466; 370/352; 370/401; 709/230
(58) Field of Classification Search
None
See application file for complete search history.

(56) References Cited

U.S. PATENT DOCUMENTS

| | | | |
|---|---|---|---|
| 2003/0093563 A1* | 5/2003 | Young et al. | 709/245 |
| 2006/0233162 A1* | 10/2006 | Chow et al. | 370/356 |
| 2007/0258399 A1* | 11/2007 | Chen | 370/328 |
| 2011/0261809 A1* | 10/2011 | den Hartog | 370/352 |

* cited by examiner

*Primary Examiner* — Mohammad Adhami
(74) *Attorney, Agent, or Firm* — Wolfe-SBMC

(57) ABSTRACT

A method enabling VoIP communication sessions between a VoIP based client application and a non-VoIP standards based client application. The method includes providing a server on a digital communications network that includes runs or provides media proxy. The media proxy receives a media packet from the first communications application formatted according to a first protocol. The method includes performing packet translation on the media packet to generate a media packet that is formatted according to a second protocol that differs from the first protocol but that is used by a second communications application. The method includes transporting the translated media packet to the second communications application over the network. The packet translation includes translating the protocol while simply copying the audio-video data or payload from the original message. The communications session includes performing communications session setup between the two communications applications by signaling between these two applications.

20 Claims, 6 Drawing Sheets

CLIENT-SERVER ARCHITECTURE FOR AUDIO-VIDEO COMMUNICATIONS

BACKGROUND

1. Field of Description

The present disclosure relates, in general, to computer-implemented methods for providing audio-visual communications or media transport between two or more computer or electronics devices or two or more client applications, and, more particularly, to improved methods and systems for facilitating media transport including Voice over Internet Protocol (VoIP) communications between a client device utilizing a standards-based application and a client device utilizing a proprietary or non-standards-based application.

2. Relevant Background

Voice over Internet Protocol (VoIP) is a general term for a group of transmission technologies for delivery of voice communications over IP networks such as the Internet or other packet-switched networks. Internet telephony including VoIP communications refer to communications services such as voice, facsimile, video streams, and voice-messaging applications that are transported via the Internet rather than over the more conventional public switched telephone network. The basic steps involved in originating an Internet telephone call are conversion of the analog voice signal to digital format and compression/translation of the signal into IP packets for transmission over the Internet, with the process being reversed at the receiving end. VoIP systems may employ session control protocols to control the set-up and tear-down of calls as well as audio codecs that encode speech allowing transmission over an IP network as digital audio via an audio stream.

Communicating using VoIP may be inexpensive or substantially free for the parties of a communication or a VoIP call, and this has led to a demand by consumers for VoIP or similar capabilities on their client devices. For example, consumers are beginning to demand that nearly every client device that is able to access an IP network such as the Internet also be able to support all audio-visual communications including VoIP communications. Unfortunately, while a number of standard protocols have been developed for supporting VoIP communications (e.g., session initiation protocol (SIP) for signaling and real-time transport protocol (RTP) for media transport), many client devices run media players and other client applications that use proprietary (or non-standards-based) applications for audio-visual communications and processing of received/transmitted communications. For example, Skype® and similar standalone VoIP applications may utilize proprietary technologies and may require substantial downloads on Microsoft Windows®, Apple® Mac, Unix®, and the like.

SIP is widely used over the Internet for voice and video calls between client devices or client applications. SIP is considered a standard signaling protocol by many major infrastructure, telecommunications, and cable companies for controlling multimedia communication sessions, e.g., for signaling control of video conferencing, streaming multimedia distribution, instant messaging, presence information, and online games. SIP is typically used for creating, modifying, and terminating multiparty sessions made up of one or several media streams. Extensible messaging and presence protocol (XMPP) is another signaling protocol often used for instant messaging and presence, and other standard signaling protocols may be used for voice communications. VoIP standard protocols or standards may also include protocols such as RTP and RTSP (Real Time Streaming Protocol) and non-real time streaming protocols that are used to define standardized packet formats for delivering audio and video over the Internet (e.g., to handle streaming media or media transport such as IP telephony communications and video teleconference applications).

While there is a wealth of open source and commercial software available for SIP, RTP, and other standards-based VoIP communications, each of these communications techniques require software installation on each client device. Today, client devices typically include applications such as Adobe System Incorporated's Flash Player and similar media players for allowing a client device to receive and transmit audio-visual communications (or provide media transport including media streaming at the client device) over communications networks such as the Internet. For example, the Adobe Flash Player is software for viewing animations and movies using computer programs such as a web browser and is a widely distributed proprietary multimedia and application player. Typically, Adobe® Flash Player is an application execution environment that is implemented in native code (e.g., as a plugin to a web browser) and may be thought of as the virtual machine that is used to run often used Flash® files and otherwise provide bidirectional streaming of video and audio. However, many such client applications utilize proprietary codecs or software and network protocols such that they have a closed nature. In other words, voice codecs and network protocols that are proprietary may make it difficult or impossible for a first client device to communicate with a second client device that implements VoIP communications in a standards-based manner. Efforts to allow proprietary client devices and/or applications to communicate VoIP have not been widely adopted and have generally involved providing addition software or applications that have to be run on each client or as part of each client's media player.

SUMMARY

Briefly, a client-server architecture is provided to support audio-video communications using an IP-based network such as in the form of Voice over Internet Protocol (VoIP) communications. The communications may be between a VoIP standards-based client or communications application and a non-VoIP standards-based client such as a media player (e.g., a device running Adobe® Flash Player or another software application executed by an application runtime environment virtual machine that is using proprietary or non-VoIP standards-based media transport/packet formatting). In the architecture (and associated method), a distinction is made between signaling (e.g., setting up a media/communications session between the client applications) and media transport during such a session. Signaling is implemented by the media player (e.g., Adobe® Flash Player or the like) such as using VoIP standards for signaling (e.g., using Session Initiation Protocol (SIP) signaling or the like) while media transport is implemented with the media player communicating with the other client application via a media proxy.

The media proxy may run on a media server linked to the network and act as an endpoint for the other client application (e.g., a standards-based endpoint) and also as a protocol translator to present media packets to either of the two communicating client application in a form they expect and can consume (e.g., acts as a translator between Real-Time Protocol (RTP) and Real Time Messaging Protocol (RTMP), which are the communication protocols available in Adobe® Flash Player that allow media packets to be directly and efficiently sent at runtime through the operating system with no need for media to be passed through the virtual machine of Adobe®

Flash Player). Typically, only the protocol portion of the message or media packet is altered while the payload or audio-video data is simply copied to create a translated/new message to pass on to the proper endpoint application.

More particularly, a computer-implemented method is provided for enabling VoIP communication sessions between a VoIP based client application (such as Google Talk, X-Lite, or the like) and a non-VoIP standards based client application (such as Adobe® Flash Player or the like). The method includes providing a server on or linked to a digital communications network. The server includes a microprocessor that executes programs or code to provide a media proxy with a media packet translation module. The method continues with the media proxy acting, in response to instructions from a first communications application (e.g., a proprietary media player), to create a port (e.g., a User Datagram Protocol (UDP)/RTP port) on the network for use in media transport. The method also includes in response to further instructions from the first communication application, operating the media proxy to associate a network address with a second communications application running on a second client that is in communication with the network. The media proxy may then receive a media packet from the first communications application that is formatted according to a first protocol (e.g., RTMP if the application is an Adobe® Flash Player).

The method then includes performing packet translation on the media packet to generate a translated media packet that is formatted according to a second protocol that differs from the first protocol but that is used by the second communications application for media processing/transport (e.g., a VoIP based media protocol such as RTP or the like). The method then includes transmitting the translated media packet over the network from the media proxy to the second communications application at the network address. The packet translation may include generating a protocol portion based on but with modification/changes to the protocol portion of the media packet from the first communications application (or the media player), while a payload portion may be provided in the translated media packet by simply copying directly the payload (e.g., media data such as audio-video data) of the original media packet to the new media packet/message (e.g., no data transcoding required). As noted above, the communications session may also include signaling, and the method may include performing communications session setup between the two communications applications by signaling between these two applications (e.g., directly or through a signaling process by initiation of the first communications application/media player but separate from the media proxy) such as according to the SIP or the Extensible Messaging and Presence Protocol (XMPP). The method may further involve tear down of the media session.

DETAILED DESCRIPTION

Figure 1:
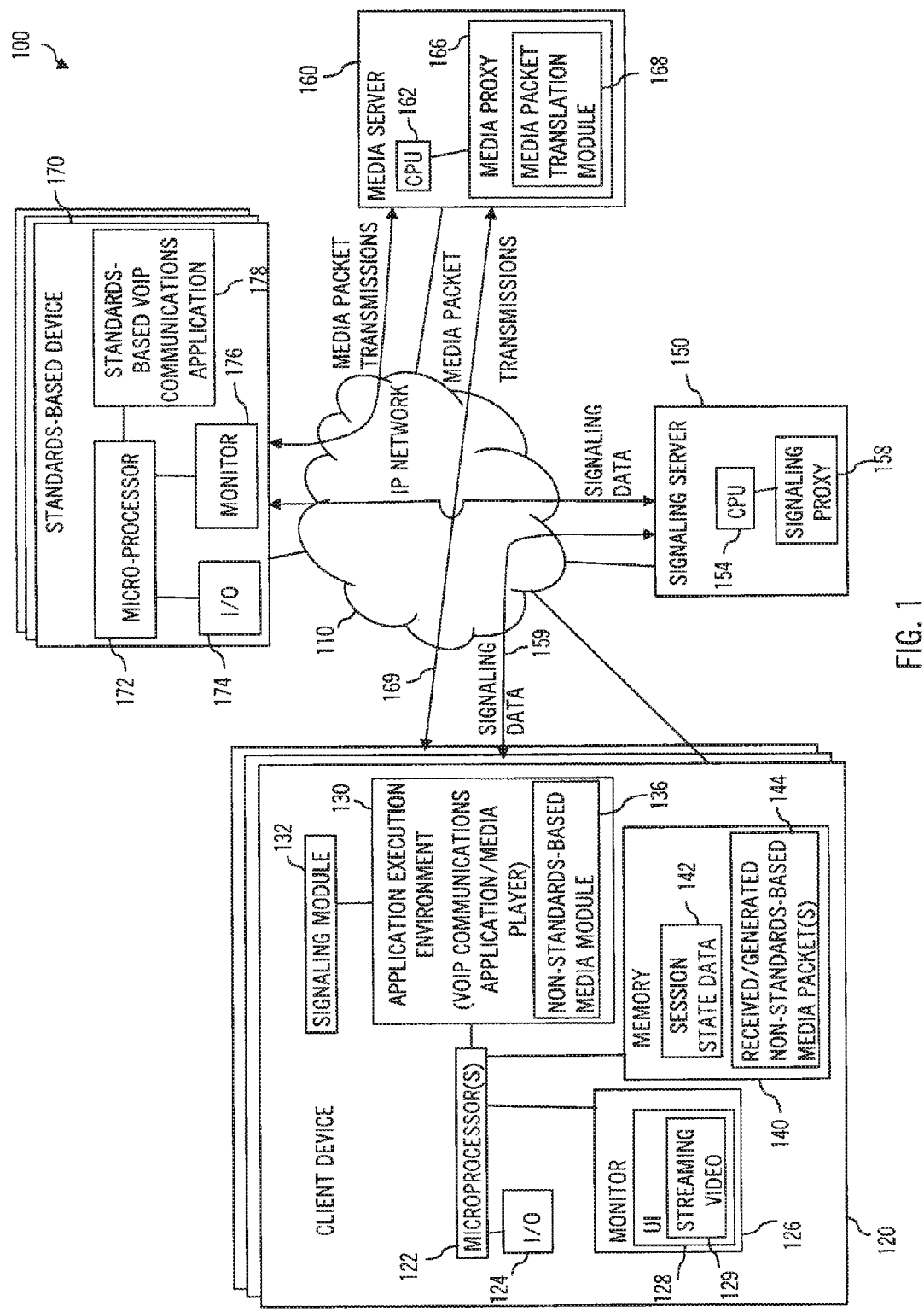
FIG. 1 illustrates in functional block form a computer system implementing a method of transporting, over an Internet protocol (IP) network such as the Internet, audio-visual communications between various client applications with at least one of the applications utilizing a non-standards-based media player/communications application (e.g., a proprietary media player) while other client applications communicate using or based on standard IP network protocols (such as conventional Voice over IP (VoIP) protocols/standards)

The following description describes the use of software (and/or hardware) implementations to provide a client-server architecture to enable or provide audio-video (media data) communications between a first client running a first Voice over IP (VoIP) communications application and a second client running a second and different VoIP communications application. For example, the first VoIP communications application may be a media player that utilizes a proprietary or non-standards-based media communications/processing software or module (such as Adobe® Flash Player) while the second VoIP communications application may use a standards-based media communications/processing software such as one based on the Real-time Transport Protocol (RTP) and the Session Initiation Protocol (SIP). To this end, the communications methods and systems described herein make a distinction between, and handle differently, signaling (e.g., setting up the media or communications session) and media transport.

At the first client running the non-standards-based VoIP communications application or media player, signaling may be implemented with a signaling module so as to establish the session and handle state information according to a standards-based manner (e.g., maintain state data for the session at the first client and comply with SIP or other VoIP protocol/standard). The signaling module may be developed using ActionScript® or the like. In contrast, though, the non-standards-based VoIP communications application or media player may include a media module that acts to send all media (which is formatted in packets according to a proprietary or non-standard protocol for VoIP communications) through a media proxy, which may be communicatively linked to the first client and provided on a media server. The media proxy may include mechanisms such as software modules including a media packet translation module to allow it to act, in part, as a protocol (or media/message) translator between a first protocol (i.e., a non-standard protocol such as Real Time Messaging Protocol (RTMP), Real Time Media Flow Protocol (RTMFP)) and a second protocol (i.e., a VoIP standard protocol such as RTP).

As will be understood, RTP is widely used to transfer both time-sensitive and non-real time media between standards-based endpoints or client applications in VoIP communications sessions, but many ubiquitous media players on client devices (such as Adobe® Flash Player) do not support RTP, and the media proxy allows the non-standards-based media player to communicate with a client using a standards-based application such as by transporting media to and away from the media player as RTMP, RTMFP, or other proprietary or non-standards-based protocol for media. In this manner, the media proxy behaves as a proper VoIP endpoint (e.g., an RTP or other standards-based endpoint) on behalf of the first client (or non-standards-based communications application/media player) such that the first client's application appears as a conventional media endpoint to the second client (or standards-based communications application/media player such as one that is an RTP media endpoint or the like supporting VoIP communication sessions). The described client-server architecture is well-suited for both real-time collaboration and non-real-time streaming applications to allow client devices to communicate media (audio and/or video digital data) over an IP-based network such as the Internet.

In this description, the term "media player" or "media player program" is intended to be understood relatively broadly to be a media player or real-time communications application that can process and output media content on a client device or computer. For example, the media player may be a program written for a particular operating system (OS) on a computer platform or be platform-independent software that runs inside another program, such as a runtime environment, on a computer platform. The media player, which may be an Adobe® Flash Player, typically provides the runtime or application execution environment and may be written in native code for several platforms. It may have or provide a virtual machine that executes bytecode. In the example of an Adobe® Flash Player being used as the media player/application execution environment, ActionScript® may be the programming language that is compiled to bytecode that this being executed.

Adobe® Flash Player is used an exemplary media player in this description in part because it is deployed in over ninety percent of Internet-connected computers or client device. It can almost be assumed that this media player is available on everybody's computer or client device. The widespread use of such media players is one of the aspects that make the methods and systems described herein desirable. A user/operation can simply implement their system once and it will run anywhere without download and installation. With the proposed scheme, a user may make a phone call from a web browser without downloading/installing any additional components.

Compiled ActionScript® executed by Adobe® Flash Player virtual machine may be slow compared to native code, but signaling does not have to be fast. Most of the time, signaling waits on user input (e.g., to answer ringing device and the like). On the other hand, media has to be relatively fast since it is real-time. Having more than a few hundreds of millisecond delay between two end-points may render the communications unusable (or, at least, not as desirable). There is lots of processing involved in the media content processing including to capture audio, compress it, transmit it over network, receive it by other endpoint, decompress it and play it out. Hence, it may not be desirable to do media handling in ActionScript® or the like. Hence, the description of some implantations here includes all media handling being done directly by the application execution environment (which is written in native code). This holds even stronger for video as video is much more data and computation expensive than audio. Further, the reason that the described methods and system typically do not include media transcoding is that it introduces additional delay and can be very computational expensive.

FIG. 1 illustrates a computer system or network 100 that may be used to provide VoIP or similar network-based communications of media over a digital communications network 110 such as an IP-based network (e.g., the Internet or the like). The media that is communicated may be audio communications, video communications/data, or the like that is transmitted in data packets over the network 110 such as the case when using VoIP and similar transmission technologies. The system 100 includes a number of client devices 120 that are adapted with an application execution environment 130 that provides a VoIP communications applications (e.g., media players) 130, which may utilize media communications or processing applications 136 that are non-standards-based. In other words, the media player or application execution environment 130 may utilize a proprietary media module 136, such as that provided in Adobe® Flash Player or the like, that is not adapted for handling media packets that are formatted according to a standard communications protocol such as RTP used in standards-based VoIP sessions. The media module 136 may be thought of as processing media (e.g., generating, transmitting, playing, and so on) that is formatted according to a first protocol that differs from a standards-based second protocol (e.g., processes media RTMP or RTMFP packets that differ from RTP packets).

The client device 120 may take the form of nearly any electronic or computing device that is adapted for communicating in a wired or wireless manner over an IP network 110. For example, the client device 120 may be a desktop or portable computer, a cell/wireless phone, an Internet-ready television, or the like. The client device 120 includes a microprocessor 122 that manages or controls operation of input/output devices 124 such as a keyboard, a touchscreen, a mouse, a voice input, and the like and the I/O device 124 may include devices to support making calls (inputting and hearing audio and/or video communications) such as microphones, speakers, and cameras. The client device 120 may include a monitor 126 that provides a screen on which a user interface or GUI 128 is displayed and the UI 128 may include one or more visual or video displays 129 including video streaming (e.g., video that may be provided as part of a video conference or a audio-video telephony communication over the network 110 with another client device 120 or a standards-based device 170).

The client device 120 uses the microprocessor 122 to run or execute a VoIP communications application (such as media player) 130 that, as discussed above, is non-standards-based as it runs or accesses a media module 136 (providing audio, video graphics, a virtual machine, networking, and/or similar components) that utilizes a proprietary or non-VoIP standards protocol (such as Adobe® Flash Player or the like). The media player 130 may execute a byte code that implements (in addition to a user interface and the like) standards-based signaling, and media is handled natively in application execution environment/media player 130 (e.g., with media module 136). In other words, a media player program may be instantiated to provide application execution environment 130, which can provide a virtualized platform-independent foundation for a media player such as Adobe® Flash Player to relate to the underlying operating system of the computer or client device 120. Note, although the application execution environment 130 may reside in firmware, some or all of the application execution environment 130 may reside in software with media player program.

The media player 130 may call or execute an application that implements a signaling module 132, which acts to set up VoIP or network communications using the same protocol as other devices (such as device 170). In one embodiment, the signaling module 132 provides signaling data 159 via network 110 to a signaling server 150 (which may include a CPU/microprocessor 154 running a signaling proxy 158) to establish a communications session with a standards-based device 170 (or another client device 120), and the signaling module 132 may act to maintain session state data 142, which may be stored at least temporarily in device memory 140. The communications may be divided into signaling and media transport for handling separately by the signaling module 132 and media module 136 in part because the signaling has state (which is maintained by the signaling module 132 as shown at 142) while the media transport as shown at 169 over network 110 to media server 160 is generally stateless (or over a relatively short time period/well-defined).

During operations of the system 100, the client device 120 may engage in a communications session with the standards-based client device 170. During such a communications session (which may be a VoIP session or partially VoIP session), the signaling module 132 may handle signaling for the media player 130 by communicating signaling data 159 to the signaling proxy 158. Media transport is handled mainly by the media proxy 166 that is run by CPU 162 on a media server 160, which is linked to the devices 120, 170 by network 110. The media proxy 166 acts as standards-based peer for the device 170 to receive and transmit media packets in a standardized form (such as per RTP or the like) but includes media packet translation module 168 so as to also be able to receive and transmit as shown at 169 media packets in non-standardized form (such as per RTMP, RTMFP, or the like) with client device 120.

The standards-based device 170 may be adapted similarly to client device 120 with a microprocessor 172, I/O 174, and monitor 176 for allowing VoIP communications over network 110. The device 170 may also include signaling and media modules that are implemented in native code, with both its signaling and media modules supporting appropriate standards. However, the client 170 uses microprocessor 172 to run a standards-based VoIP communications application 178 rather than a proprietary media player or communications application. As a result, the device 170 is able to enter into and participate in VoIP communications sessions without use of signaling module 132 and media module 136 that act to divide up the signaling and media transport functions for media player 130. For example, the application 178 may be an instance of Google's Google Talk application, CounterPath's X-Lite application providing an SIP-based softphone on the device 170, or other application adapted for supporting the protocols/standards associated with VoIP communications over network 110. The provision of the media proxy 166 and the signaling module 132 allow the standards-based device 170 and the non-standards-based client device 120 to be able to effectively enter a network communications session (e.g., to communicate over the IP network 110 via VoIP).

In one embodiment of the system 100, signaling is provided at the client-side by signaling module 132. The client-side signaling module 132 may be implemented using ActionScript (such as when the media player 130 is an Adobe® Flash Player) or other programming language for execution by processor 122 (note, though, that processor 122 typically executes assembly or similar language with a virtual machine of Adobe® Flash Player or the like (e.g., an application's execution environment) executing byte code that is compiled from ActionScript® or the like). By providing the signaling control/functions in a divided manner and client-side, features can be easily added without requiring any update or changes to the media proxy 166, which is provided server-side and acts to handle the divided function of media transport in system 100. Signaling can be easily changed at client side (such as due to a buggy SIP/XMPP server implementation), and the client-side signaling module 132 allows for rapid development and debugging. The system 100 is extremely scalable as signaling via module 132 requires no server resource(s). The media proxy 166 may be used to provide a very lightweight media server 160, and as such, it is also very scalable.

Media proxies 166 may be deployed independently from each other in a system 100 with more than one media server 160 provided on one or more networks 110, and the media proxies 166 may be simply load balanced using domain name service (DNS) or other methods. Also, the use of media proxy 166 typically will not result in communications with the client 120 being blocked by network firewalls (not shown in system 100). Media proxies 166 may also be geographically distributed to provide smaller network delays.

Recent signaling protocols tends to push as much implementation as possible into a client, and the signaling proxy 158 may do relatively little processing/functions (e.g., function as a stateless SIP proxy merely passing SIP messages in some embodiments of system 100). Signaling is not time sensitive in many VoIP or network communications sessions (e.g., many times such sessions require user interaction) and is not, typically, computationally expensive, which allows a language such as ActionScript or the like to be used to provide the signaling module 132 for media player 130 to implement signaling 159 such as SIP/XMPP-based signaling.

The system 100 (e.g., proposed client-server architecture for VoIP/network communications) is generally based on the concept of separation of signaling and media transport. The signaling in system 100 is performed by the media player 130 of each client 120, and the media player's signaling module 132 may use a Socket class or the like to directly communicate to or with a signaling server 150, which may include an SIP proxy/XMPP server 158 or similar mechanism. The media proxy 166 is sometimes referred to as a Flash® media proxy or FMP particularly when the media player 130 is an Adobe® Flash Player distributed by Adobe Systems Incorporated (which may be an ActionScript® Socket class), and the media proxy 166 is not included in the signaling at all. The media proxy 166, however, may provide certain information to the media player 130 (such as its external IP address and so on) as may be useful to support or facilitate signaling with another device 120 or 170.

During operation of the system 100, a client device 120 may make or receive a call over the network 110 to one of the standards-based devices 170. The media player 130 establishes a connection to the media proxy 166 such as using a proprietary or non-standards-based connection mechanism provide in player 130 or in its media/communications module 136 (e.g., by using RTMP/RTMFP NetConnection or the like). The media player 130 then instructs the media proxy 166 to establish a communications session endpoint for a particular standards-based device 170 such as by setting up an RTP endpoint. If successful, the media proxy 166 may return the IP address and port number, which the media player 130 may store in memory 140 (not shown in FIG. 1) and include in media session setup. Other end points in the system 100 (such as those set up by standards-based devices 170 or other devices 120) see the media proxy 166 on server 160 as the RTP (or VoIP) endpoint for the media player 130. In practice, for interactive communications, the media player may open both an incoming and an outgoing proprietary communication stream 169 with the media proxy 166 (e.g., when the player 130 is an Adobe® Flash Player run by processor 122 the player 130 may open incoming/outgoing RTMP/RTMFP streams). The media player 166 may use a single communication port (such as a user datagram protocol (UDP) port) for both outgoing and incoming media from the IP network 110. Some media proxies may use a single UDP port for incoming/outgoing audio and a separate UDP port for incoming/outgoing video.

When a media packet is received from a third-party endpoint (such as the device 170 or an endpoint associated with device 170) that complies to VoIP standards communications, the media packet is forwarded by media proxy 166 such as a TC message (shown at 169 in FIG. 1) to the media player 130 of client device 120. "TC" stands for TinCan message, which is the message format used by Adobe® Flash Player. TC messages are transported over by RTMP/RTMFP (an analogy for TC message is RTP packet, which is transported over UDP). Likewise, when a TC message 169 is received from media player 130 by the media server 160, the media proxy 166 acts to immediately forward it to the appropriate third-party endpoint such as device 170 or standards-based VoIP communications application 178 over IP network 110. To this end, the media proxy 166 may maintain a forwarding table (not shown in FIG. 1) in the memory of server 160. An entry (device 170 or application 178) in the media forwarding table may uniquely be identified by its destination address, UDP or similar port, SSRC (synchronization source), communications socket (e.g., a non-standards-based or proprietary socket such as an RTMP socket or the like), and a stream ID (such as for the media player 130 which may be a Flash Player or the like).

In some embodiments, the media proxy 166 may be responsible in system 100 for translating a media specific header. For example, the media proxy 166 may translate a message header between a media header specific to the player (e.g., Adobe® Flash Player) to a standards-based header associated with the third-party endpoint or application 178 (e.g., the media proxy 166 may translate, in an Adobe® Flash Player implementation, between TC message header and RTP packet header and copies the payload, with support provide (for example) for Speex audio (RFC 5574) and H.263 (RFC 2190)). The media proxy 166 may also perform Dual Tone Multi Frequency (DTMF) translation when necessary or useful. When DTMF is received by RFC 2833 for example, the media proxy may send a data TC message 169 to the media player (such as an Adobe® Flash Player) of the DTMF digit. When the media player 130 sends a TC data message 169 containing a DTMF digit, the media proxy 166 may translate it to RFC 2833 (in this particular example of system 100). Likewise, when SIP INFO message is used for DTMF, it is typically done between the SIP proxy 158 and the media player 130 (signaling module 132) without the media proxy 166 being involved. When communications end (a communications session is terminated in system 100), the media player 130 may send a message 169 to the media proxy 166 to cause the proxy 166 of media server 160 to tear down allocation. Allocation may also be configured to time out after a certain time period of inactivity (or lack of communications between a client device 120 and a standards-based device 170).

The media proxy 166 includes a media packet translation module 168 for transforming media packets from the media player in a proprietary or non-VoIP standards format to a VoIP standards format expected by the standards-based device (and vice versa). Typically, the media packet translation module 168 of media proxy 166 only transforms the protocol of the media packet. In one embodiment, the media player 130 is an Adobe® Flash Player using RTMP/RTMFP for media packet formatting and the device application 178 uses RTP, and in this case, the translation module 168 may act to transform between RTMP/RTMFP and RTP. Specifically, the media proxy 166 behaves as an RTP endpoint on behalf of the Flash Player 130 but the media proxy (or Flash® Media Proxy) does not, typically, perform media transcoding. While the examples show a media proxy 166 that supports an Adobe® Flash Player 130, the system 100 may provide media proxies 166 with translation modules 168 that are useful for supporting nearly any media formats that are native to a particular non-standards-based media player 130/module 136 (e.g., not limited to RTMP/RTMFP translations on the client side of proxy 166).

Figure 2A:
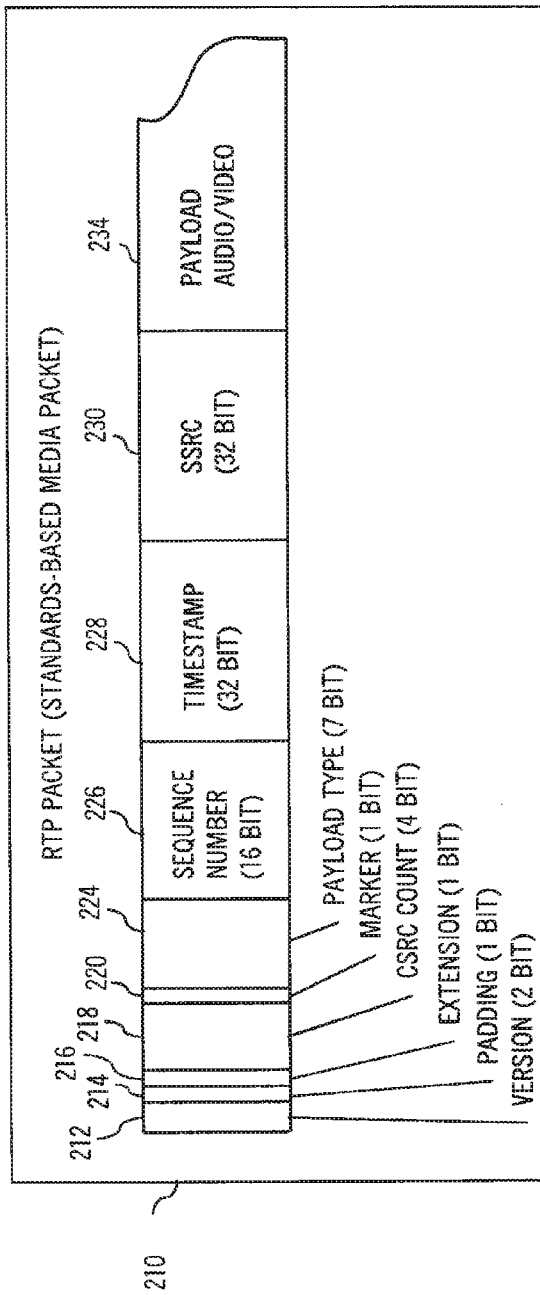
FIGS. 2A and 2B illustrate an exemplary standards-based media packet and an exemplary proprietary or non-standards-based media packet showing a representative media packet translation that may be performed by a media proxy to allow two client applications running differing VoIP communications applications to have a network-based communications session.
Figure 2B:
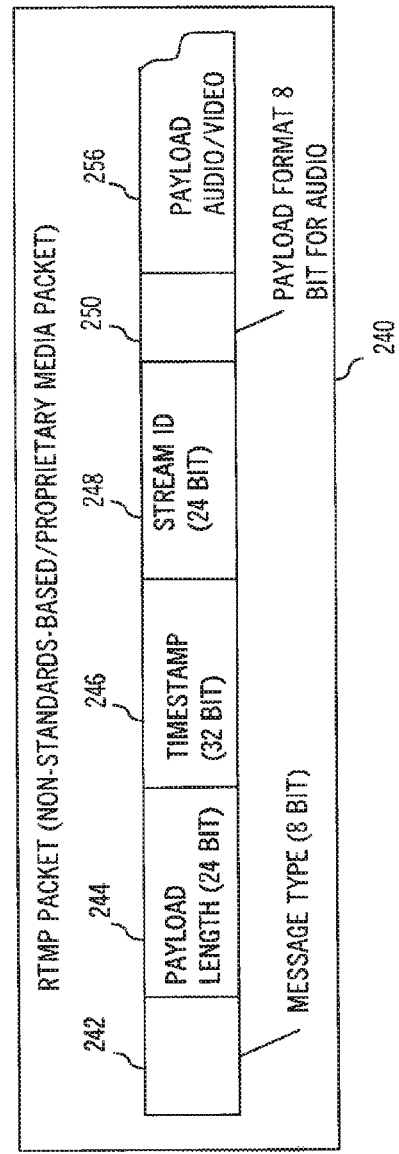

FIGS. 2A and 2B illustrate a VoIP standards-based media packet 210 and a VoIP non-standards-based (or proprietary) media packet 240. In operation of a media proxy (such as proxy 166), a client device using a proprietary or non-standards-based media player or VoIP communications application may generated the packet 240 (or one having a differing protocol based on another proprietary media formatting/messaging protocol) while a client using a media player or VoIP communications application that is based on a VoIP standard may generate and transport the media packet 210. In this example, the VoIP standards media packet 210 is an RTP packet while the non-standards-based media packet 240 is an RTMP packet, and the media proxy is adapted (such as with a protocol translation module) to translate the protocol of a media packet between RTP packet and TC message (in this example but more generally from a proprietary/non-VoIP standards-based protocol to a VoIP standards protocol for media packets).

As shown in FIG. 2A, the RTP packet 210 includes a protocol portion and a payload-related portion. Specifically, the protocol portion may include fields/segments such as version 212, padding 214, extension 216, CSRC count 218, marker 220, payload type 224 (whatever was negotiated), sequence number 226 (the media proxy may keep track of sequence numbers and increment these), timestamp 228 (same as RTMP message), and SSRC 230 (media proxy may generate a random number when translating from RTMP to RTP) while the payload may be provided a field/segment labeled payload audio/video 234 (same as in RTMP message). In contrast, the RTMP packet 240 may include a protocol portion including fields/segments such as message type 242 (audio or video), payload length 244 (calculated from RTP payload), timestamp 246 (same as in RTP header), stream ID 248 (media proxy may keep track of this ID, which is created when subscribing stream is established between media player and media proxy), and payload format 250 (what was negotiated) while the payload portion of the media packet 240 is identical to the payload audio/video of packet 210 as is shown at 256 of packet 240. The packet 210 is provided for example only with values that are fixed for this particular implementation but not as a general rule. Additionally, the stream ID is typically created when subscribing or publishing stream is established.

The audio/video payload 234 and 256 is not modified during protocol translation, but it is, instead, directly copied between RTP and RTMP packets 210, 240. Timestamp 228, 246 is also typically not modified during protocol translation and is copied between the RTP and RTMP packets 210, 240. However, the timestamp could be modified depending on the resolution. For example, Adobe® Flash Player expects a timestamp in millisecond resolution. A standard-based media endpoint or peer may provided a timestamp, e.g., in sample resolution (0.0625 ms or the like), and this will be translated. Note, some of the protocol information of each packet is maintained in the translated media packet but may be provided in differing order/fields. During use, the media proxy may perform packet translation (or protocol translation) to translate an RTP media packet 210 to an RTMP media packet 240 for consumption by a Adobe® Flash Player (i.e., translate from a VoIP standards-based packet to a non-VoIP standards-based packet) and/or to translate an RTMP media packet 240 to an RTP media packet 210 for consumption by a VoIP standards based media player or VoIP communications application.

Figure 3:
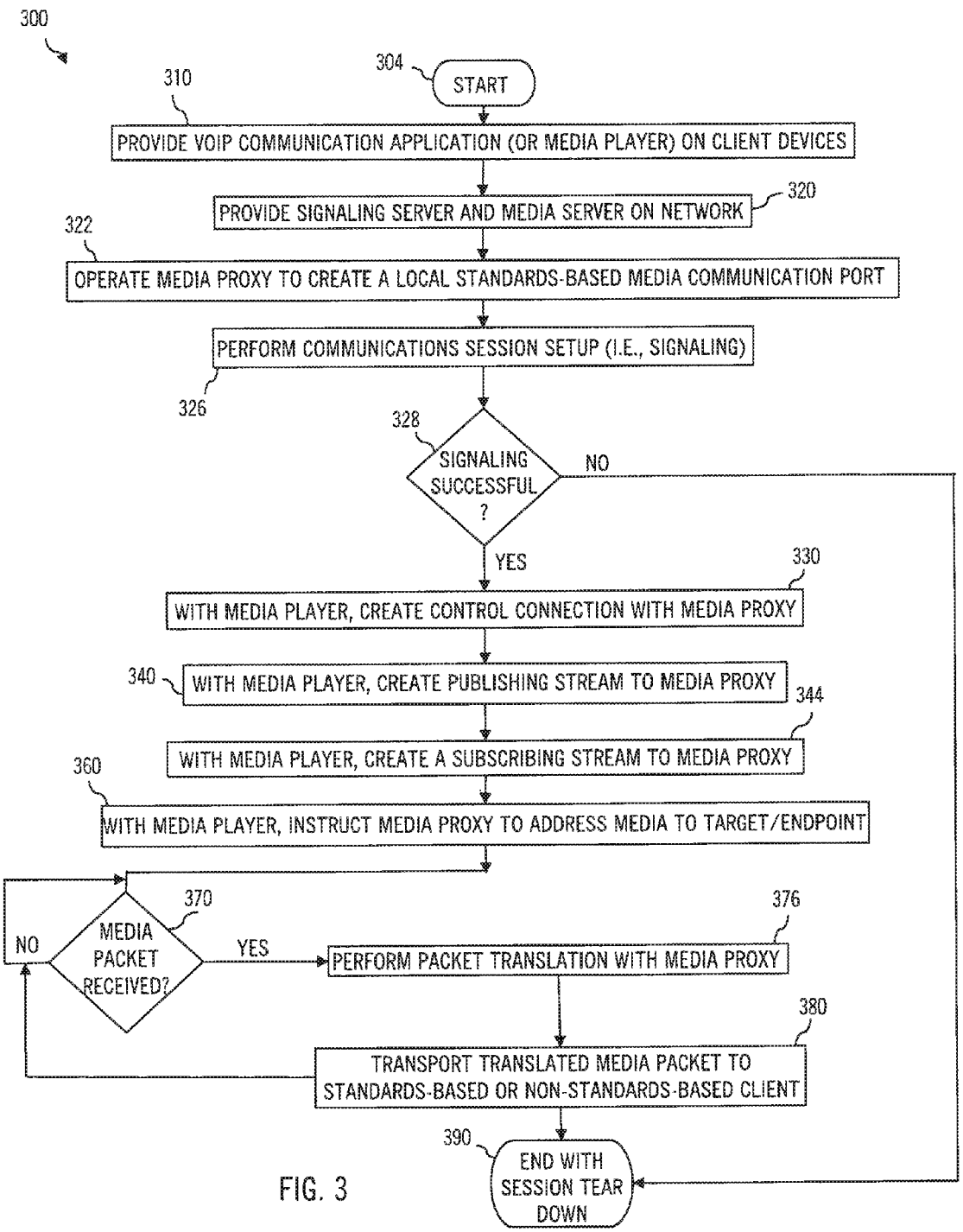
FIG. 3 is a flow diagram of a client-server based method for providing network-based (or VoIP) communications of media (audio and/or visual/video data) between network nodes or clients.

FIG. 3 illustrates a method 300 that may be performed during operation of system 100 of FIG. 1 to provide a client-server architecture that is operable to support audio-video communications between network clients (e.g., between a client using VoIP standard communications and a client using proprietary/non-standard communications at least of media transport). The method 300 starts at 304 and this may include identifying the types of VoIP standard protocols that will be supported for signaling (such as SIP or the like) and for media transport (such as RTP or the like) and also identifying the types of proprietary media transport protocols/techniques to be supported (e.g., such as RTMP/RTMFP or the like) to allow design/selection of the media proxy and its media packet translation module(s). At 310, the method 300 includes providing a VoIP communications application or media player on one or more client devices that are adapted for communication over an IP-based network (such as the Internet). These VoIP communications applications may take the form of proprietary media players such as an Adobe® Flash Player, and each of these applications typically is configured as discussed with reference to FIGS. 1 to 2B with a signaling module 132 as well as a non-standards-based media module 136 for transporting media 169 in a non-VoIP standards-based format (or according to a protocol other than RTP or the like). The application 130 is also adapted to communicate with a media proxy 166 in a client-server arrangement as described herein.

Figure 4:
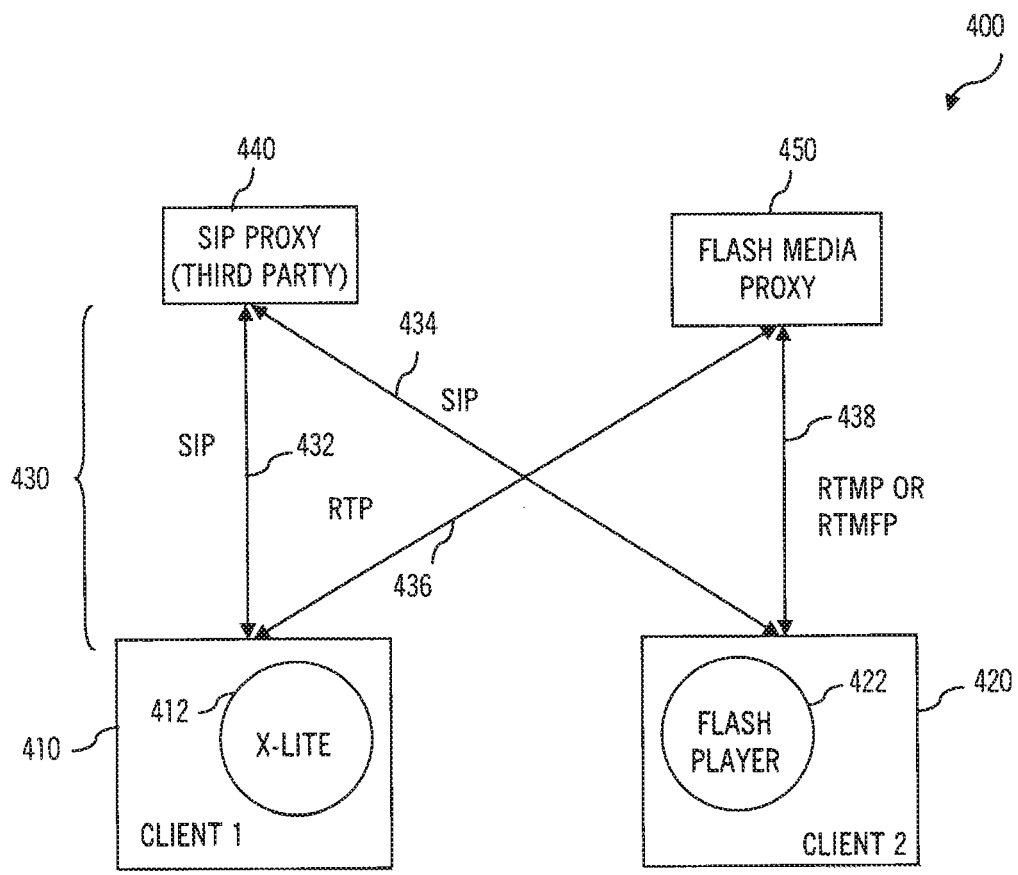
FIG. 4 is a functional block drawing of a network-based communications system showing a first example of communications between a client running a first communications application and a client running a second, differing communications application.
Figure 5:
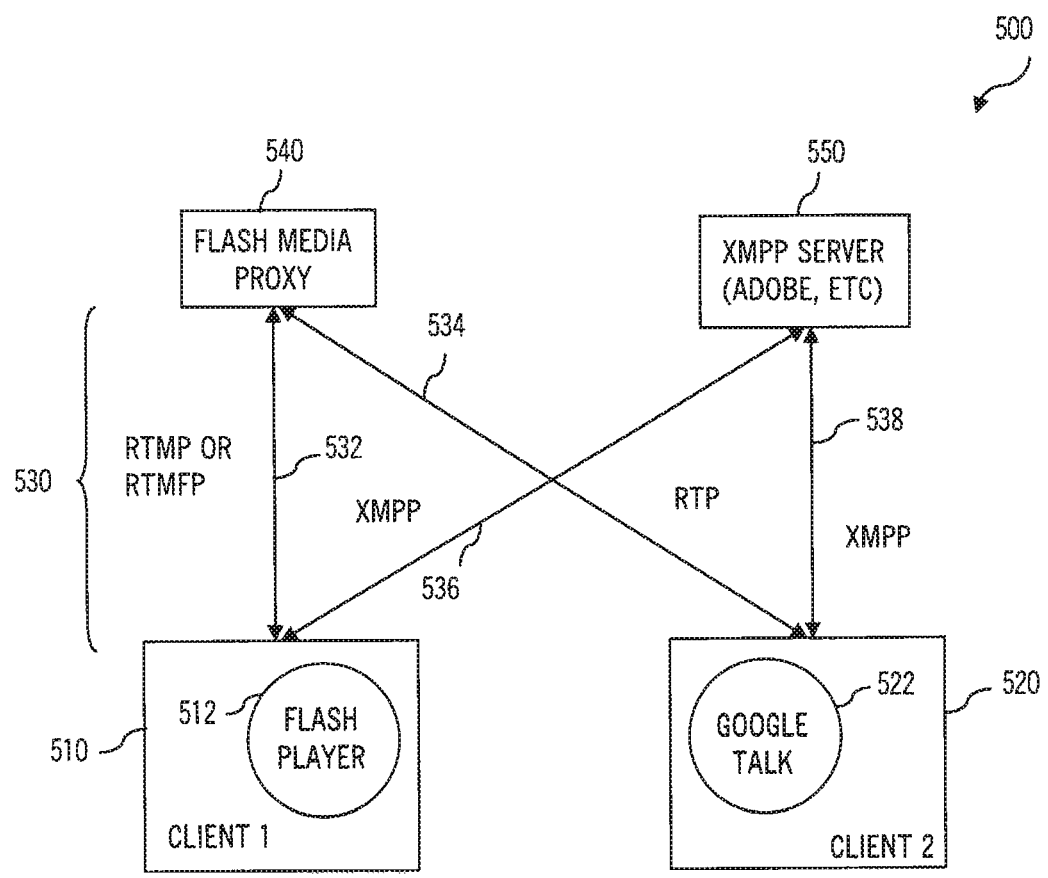
FIG. 5 is a functional block drawing of a network-based communications system showing a second example of media communications between a client running a first communications application and a client running a second, differing communications application.

A communications system or network is further configured or initiated at 320 with providing a signaling server with a signaling proxy on the network for accessing by the client device(s) and also providing a media server on this network. The media server includes a media proxy that is selected and configured for supporting the particular VoIP communications application provided on the client device(s) and one or more VoIP standards-based clients or endpoints (e.g., the media proxy may be configured to support RTMP/RTFMP on the client side and RTP or another media transport protocol on the third-party endpoint side or another arrangement as shown in FIGS. 4 and 5). In other words, the media proxy behaves as a media server (e.g., a Flash® Media Server when the client media player is Adobe® Flash Player) from the point of view of the media player on the client devices.

At 322, the media proxy is operated to create a local standards-based media communication port. For example, the media player may instruct the associated media proxy to create a local UDP/RTP port which it will use for media transport. At 326, the signaling module may act to perform communication session setup (i.e., signaling) via a signaling server that may provide a signaling proxy. In other words, signaling is separated from media transport in method 300 and may be performed even by the client media player or VoIP communications application according to a VoIP signaling standard/protocol such as SIP. When signaling is not successfully completed as shown at 328, the method 300 may include the media proxy acting to close the allocated port.

At 330, the media player is operated (by a microprocessor or CPU) to create a control connection with the media proxy. For example, a NetConnection may be created from the media player to the media proxy that is available on a server on the network and that is the media proxy to which it will send and receive media transport commands. At 340, the media player functions to create a publishing stream to the media proxy. For example, a NetStream may be created to a media proxy where the media player will send audio/video media packets.

At 344, the media player is further operated to create a subscribing stream to the media proxy on the media server. For example, the media player may create a NetStream to the media proxy establishing from where the media player will receive audio/video media packets over the network. At 360, the media player is operated to instruct the media proxy to address media to a particular target client application/device or endpoint (e.g., a VoIP standards-based endpoint). This may involve the media player instructing the media proxy of an address of a remote endpoint where media is to be sent and where media may be received from during a VoIP or communications session on a network.

At 370, the media proxy acts to determine when (or wait for) an additional/next media packet is received from the media player of the client or from the previously designated remote endpoint. When none is received, the media proxy continues the session by waiting for a next packet (or may time out and terminate the session at 390). When a next media packet is received at 370, the method 300 continues at 376 with the media proxy performing packet translation as described with reference to FIGS. 2A and 2B above. At 380, the translated media packet is transported from the media proxy to the standards-based client/remote endpoint or to the non-standards-based client running the proprietary media player (such as Flash Player or the like). The method 300 then may continue at 370 with transmitting or receiving additional media packets or terminate/end at 390 with session tear down.

With regarding streaming from a media player to a third-party (standards-based) client, session setup (such as beginning at step 326 in method 300 for example) may involve signaling between a non-standards-based or proprietary media player and a third-party endpoint. During this signaling, a payload type for media may be determined, which may be fixed for the rest of the session. At media setup time, the media proxy may generate SSRC, and this may also be fixed for the duration of the session. Then, when an RTMP or non-standards-based media packet is received from a media player, a new RTP or other VoIP standards-based message is created by the media proxy on the media server. During such message generation/translation, the version, padding, extension, CSRC count, and marker may be fixed and added to the RTP message. A payload type may be added to the RTMP message, and a sequence number may be incremented and then added to the RTP message. A timestamp may be taken or copied from the RTP message, and the SSRC may be added to the RTMP message as called for with RTP-based messages. In some cases, the timestamp may also be re-scaled. Further, audio/video data is copied (the media payload) is copied from the RTMP message or media packet(s) to the new RTP message, and the RTP message is sent by the media proxy to the third-party client or VoIP standards-based endpoint.

With regard to streaming from a third-party (or VoIP standards-based) client to a media player (or non-VoIP standards-based communications application), the session setup may involve signaling between the media player and the third-party client/endpoint that is handled, in some cases, with a signaling module of the media player according to VoIP standard signaling techniques (e.g., using SIP or the like). During this session setup, the payload type may be determined, and the payload type may be fixed for the rest of the session. Then, the media player may act to create a subscribe flow to the media proxy, and this may include determining a stream ID and then fixed for the duration of the session. When an RTP or other standards-based message is received at the media proxy from the third-party endpoint (which sees the media proxy as the session endpoint for the media player), a new RTMP message is created by the media proxy (as discussed for example with reference to FIGS. 2A and 2B). The message type may be set to either audio or video, and the payload length is calculated from the RTP message. The media proxy translation module may copy the timestamp from the RTP message to the new RTMP message and add the stream ID. The payload format is set according to the negotiated session, and the audio/video data or media payload is copied from the RTP message to the RTMP message without translation/transcoding. Then, the RTMP message that has been generated by the media proxy (or outside/remote from the client) is sent to the media player for consumption/use. The timestamp may also be re-scaled as appropriate to support streaming of media.

While not limiting to the concepts described herein, it may be useful now to provide examples of a client-server architecture that provides interoperability of a particular media player (or proprietary-type communications application) with current VoIP standards/protocols used in network communications between clients over an IP network. FIG. 4 illustrates a system or client-system architecture 400 that supports or provides Flash®-SIP interoperability. In this example, a first client 410 is connected to a network 430 and runs a VoIP standards-based application 412 for use in VoIP communications (e.g., transporting audio-video messages or media packets over the network 430). In this example, the application 412 is shown as being X-Lite (e.g., a particular native application implementing standards-based signaling and media), which is a download application available from CounterPath Corporation to provide an SIP based-softphone that is able to transmit/receive RTP messages.

Also attached or linked to the network 430 is a second client 420 that runs or uses a media player/VoIP communications application 422 implementing proprietary or non-VoIP standards-based technology for messaging. In this example, the application 422 may take the form of a Adobe® Flash Player available for download from Adobe Systems Incorporated, which is implements signaling in ActionScript® that is compiled to bytecode that is then executed by Adobe® Flash Player application execution environment. The application also handles RTMP or RTMFP media packets and communicates/interacts with a media proxy 450 (as discussed herein to cause the proxy 450 to act as its RTP endpoint on network 430). The system 400 includes an SIP proxy 440 that may be run on a third-party device/server (e.g., not as part of the system providing client 420 and/or proxy 450 for example). The system 400 also includes the media proxy 450 (or Flash® Media Proxy in this example) that may run on the same or a different machine/server as the client 420 or client 410.

During use as shown, a session may be established for allowing communications over network 430 between the clients 410, 420 that utilizes the media proxy 450 for receiving/sending RTP messages for the player 422. Signaling is performed using SIP as shown at 432, 434 links/communications between the first client application 412 and the SIP proxy 440 and the second client application 422 and SIP proxy 440. Media transport is handled separately with the first client application 412 transmitting and receiving RTP messages (or media packets complying with the RTP or translated to RTP) as shown at 436 and with the second client application 422 transmitting and receiving RTMP or RTMFP messages (or media packets complying with the RTMP or RTMFP or translated to RTMP or RTMFP) as shown at 438. The translation of the messages 436, 438 is performed by the media proxy 450 (e.g., translation/modification of protocol portions with copying of the media payload or audio-video data).

FIG. 5 illustrates an example of a client-server architecture or communications system 500 that is adapted to support Flash®-XMPP (Jabber®) interoperability or VoIP communications. As shown, the system 500 includes a first client 510 and a second client 520 that are linked to a network 530 (such as the Internet or other IP-based network), and the system 500 supports VoIP communications between the two clients 510, 520 by providing a media proxy 540 on a server/device linked to the network 530 for access by the client 510 (or its Adobe® Flash Player 512) and by the client 520 (or its VoIP standards-based application 522). To support VoIP communications, the system 500 also includes an XMPP server 550 to support signaling according to a VoIP standard.

In this example, the media player 512 of the first client 510 is an Adobe® Flash Player while the VoIP standards-based communications application 522 of the second client 520 is Google Talk® available from Google. The Adobe® Flash Player 512 and Google Talk® 522 both utilize XMPP for signaling via the XMPP server 550 as shown at 536 and 538. Again, media transport is handled separately during the VoIP session over network 530. Media transport is supported by the media proxy 540 acting to receive and transmit RTMP or RTMFP messages 532 from/to the Adobe® Flash Player 512 while acting to receive and transmit RTP messages 534 to from/to the Google Talk® application 522 on the second client 520. The system 500 shows that differing signaling protocols may be supported for the signaling portion of the communications session and differing third-party client applications may communicate with a media player via a media proxy (as long as these applications such as X-Lite, Google Talk®, and the like provide RTP or another VoIP based media packet/message to the proxy 540 for translation to the proprietary form such as to a RTMP or RTMFP message).

Figure 6:
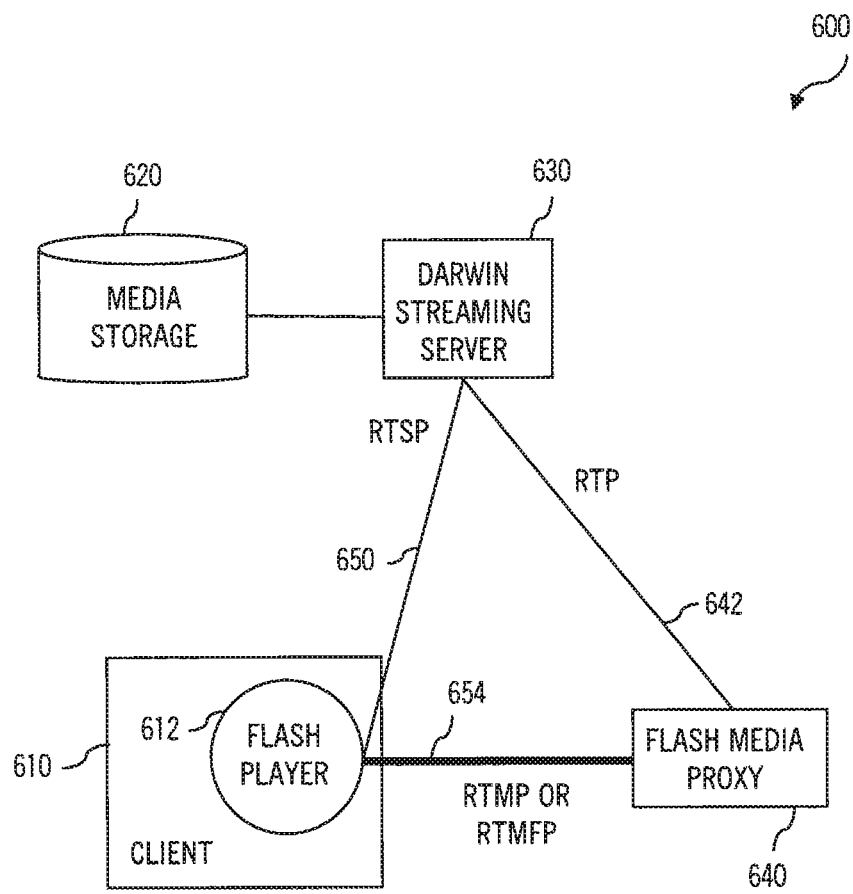
FIG. 6 is a functional block drawing of a network-based communications system showing a third example of media communications showing a client running a first communications application accessing a media store via a streaming server.

Another exemplary system or application scenario may be useful for showing the general applicability of the described methods and components. A system 600 shown in FIG. 6 may be provided that includes a client device 610 running an Adobe® Flash Player or other media player program 612 configured according to the present description. The system 600 may also include a media proxy 640 and a server 630 linked to the proxy 640 and accessed by the client device 610, and the server 630 may be operable to stream content from media storage 620 to the client device 610. The application 600 may be thought of as a one-way, non-real time application scenario, which could be a very popular use case.

For example, Darwin Streaming Server (DSS) 630 is a free server developed by Apple® and used by media sites. It supports real time streaming protocol (RTSP) shown at 650. RTSP is a signaling protocol used for media control (e.g., play, pause, and the like). The media is transported using Real Time Protocol (RTP) shown at 642. Lots of people have archived media (shown at 620) that cannot be streamed using Flash® Media Server since the file format is not supported. In this system, a user/operator of a client device 610 can use DSS 630 to directly stream these stored files to Adobe® Flash Player 612. Again, signaling is implemented in Action- Script® and media from media storage 620 is re-packetized from RTP 642 to RTMP/RTMFP 654 by the media proxy 640 which communicates with the DSS 630 (based on RTP 642) and the client device 610/Adobe® Flash Player 612 (using RTMP or RTMFP 654).

Embodiments of the subject matter described in this specification can be implemented as one or more computer program products, i.e., one or more modules of computer program instructions encoded on a computer-readable medium for execution by, or to control the operation of, data processing apparatus. For example, the modules/software used to provide the architecture/system 100, 400, 500 such as the signaling module 132, media module 136, VoIP communications application 178, signaling proxy 158, and media proxy 166 with media packet translation module 168, and the like may be provided in such computer-readable medium and executed by a processor or the like. The computer-readable medium can be a machine-readable storage device, a machine-readable storage substrate, a memory device, a composition of matter affecting a machine-readable propagated signal, or a combination of one or more of them. The term "form generating system" encompasses all apparatus, devices, and machines for processing data, including by way of example a programmable processor, a computer, or multiple processors or computers. The system (such as devices and servers 120, 150, 160, 170 of FIG. 1) can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Generally, the elements of a computer are a processor for performing instructions and one or more memory devices for storing instructions and data. The techniques described herein may be implemented by a computer system configured to provide the functionality described.

For example, FIG. 1 is a block diagram illustrating one embodiment of a computer system 100 configured to implement the methods described herein. In different embodiments, computer system 100 and its client devices 120, 170 and servers 150, 160 may be any of various types of devices, including, but not limited to a personal computer system, desktop computer, laptop, notebook, or netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or, in general, any type of computing or electronic device.

Typically, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, a digital camera, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user (with an I/O portion 124 of client device 120 or monitor 126 of device 120 or the like), embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input such as may be useful for providing telephony communications with telephony I/O or the like.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

I claim:

1. A method implemented by one or more computing systems of a media proxy, the method comprising:
  responsive to instructions received by the media proxy over a network from a first communications application, associating a network address with a second communications application, the first communications application and the second communications application part of a communication session that is setup via a network without communicating with the media proxy;
  receiving a media packet by the media proxy from the first communications application, the media packet formatted accordingly to a first protocol;
  performing packet translation on the media packet to generate a translated media packet formatted according to a second protocol that differs from the first protocol and that is associated with the second communications application, the packet translation including generating a protocol portion for use with the translated media packet that differs from a protocol portion of the media packet and copying media data from a payload portion of the media packet for use by the translated media packet; and
  transmitting the translated media packet for receipt by the second communications application via the network address associated with the second communications application.

2. A method as described in claim 1, wherein at least one of the first communications application or the second communications application is configured as a media player.

3. A method as described in claim 1, wherein the second protocol comprises a standards-based Voice over Internet Protocol (VoIP) protocol for media transport.

4. A method as described in claim 1, wherein the second protocol comprises Real-time Transport Protocol (RTP).

5. A method as described in claim 1, wherein the first protocol does not involve a Voice over Internet Protocol (VoIP) protocol.

6. A method as described in claim 1, wherein the communications session is initiated using a Session Initiation Protocol (SIP) or an Extensible Messaging and Presence Protocol (XMPP).

7. A method as described in claim 1, wherein the communications session is initiated using a signaling server that does not implement the media proxy.

8. A method as described in claim 1, further comprising:
  receiving an additional media packet from the second communications application formatted according to the second protocol;
  performing packet translation on the additional media packet to generate an additional translated media packet formatted according to the first protocol; and
  transporting the additional translated media packet over the network for receipt by the first communications application.

9. One or more non-transitory computer-readable storage media comprising instructions stored thereon that, responsive to execution by a first client device, causes the first client device to perform operations comprising:
  initiating creation of a publishing stream for use between the first client device and a media proxy executed on one or more servers linked to the first client device via a network to communicate media packets;
  initiating creation of a subscribing stream between the first client device and the media proxy that is configured to allow the first client device to receive media packets from the media proxy;
  initiating signaling, free of interaction with the media proxy, with a communications application on a second client device linked to the network, the communications application using a first protocol for media transport;
  transmitting a media packet for receipt by the media proxy and formatted according to a second protocol that is different than the first protocol;
  instructing the media proxy to create a port for use in media transport for the first client device and to provide data identifying the port to the communications application of the second client device; and
  instructing the media proxy of an address of the communications application of the second client device to which a translated media packet is to be communicated that complies with the first protocol, the translated media packet translated by altering a protocol portion and copying a payload portion including media data from the media packet formatted according to the second protocol.

10. One or more non-transitory computer-readable storage media as described in claim 9, wherein at least one of the first communications application or the second communications application is configured as a media player.

11. One or more non-transitory computer-readable storage media as described in claim 9, wherein the first protocol comprises a standards-based Voice over Internet Protocol (VoIP) protocol for media transport.

12. One or more non-transitory computer-readable storage media as described in claim 9, wherein the first protocol comprises Real-time Transport Protocol (RTP).

13. One or more non-transitory computer-readable storage media as described in claim 9, wherein the second protocol does not involve a Voice over Internet Protocol (VoIP) protocol.

14. One or more non-transitory computer-readable storage media as described in claim 9, wherein the communications session is initiated using a Session Initiation Protocol (SIP) or an Extensible Messaging and Presence Protocol (XMPP).

15. A system implemented by one or more computing systems to implement a media proxy that is configured to perform operations comprising:
  responsive to instructions received over a network from a first communications application, associating a network address with a second communications application, the first communications application and the second communications application part of a communication session that is setup via a network without communicating with the media proxy;
  receiving a media packet from the first communications application, the media packet formatted accordingly to a first protocol;
  performing packet translation on the media packet to generate a translated media packet formatted according to a second protocol that differs from the first protocol and that is associated with the second communications application, the packet translation including generating a protocol portion for use with the translated media packet that differs from a protocol portion of the media packet and copying media data from a payload portion of the media packet for use by the translated media packet; and transmitting the translated media packet for receipt by the second communications application via the network address associated with the second communications application.

16. A system as described in claim 15, wherein at least one of the first communications application or the second communications application is configured as a media player.

17. A system as described in claim 15, wherein the second protocol comprises a standards-based Voice over Internet Protocol (VoIP) protocol for media transport and wherein the first protocol does not involve a Voice over Internet Protocol (VoIP) protocol.

18. A system as described in claim 15, wherein the second protocol comprises Real-time Transport Protocol (RTP).

19. A system as described in claim 15, wherein the communications session is initiated using a Session Initiation Protocol (SIP) or an Extensible Messaging and Presence Protocol (XMPP).

20. A system as described in claim 15, wherein the media proxy if further configured to perform operations comprising:

receiving an additional media packet from the second communications application formatted according to the second protocol;

performing packet translation on the additional media packet to generate an additional translated media packet formatted according to the first protocol; and transporting the additional translated media packet over the network to the first communications application.

\* \* \* \* \*